US011181045B2

(12) United States Patent
Nagafuchi et al.

(10) Patent No.: US 11,181,045 B2
(45) Date of Patent: Nov. 23, 2021

(54) TWO-SHAFT GAS TURBINE POWER GENERATION EQUIPMENT

(71) Applicant: Mitsubishi Hitachi Power Systems, Ltd., Kanagawa (JP)

(72) Inventors: Naoyuki Nagafuchi, Yokohama (JP); Toshimitsu Morimoto, Yokohama (JP); Kazuo Takahashi, Yokohama (JP); Hironori Tsukidate, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 286 days.

(21) Appl. No.: 16/328,009

(22) PCT Filed: Aug. 30, 2017

(86) PCT No.: PCT/JP2017/031169
§ 371 (c)(1),
(2) Date: Feb. 25, 2019

(87) PCT Pub. No.: WO2018/043568
PCT Pub. Date: Mar. 8, 2018

(65) Prior Publication Data
US 2019/0195141 A1 Jun. 27, 2019

(30) Foreign Application Priority Data
Aug. 31, 2016 (JP) .............................. JP2016-169765

(51) Int. Cl.
*F02C 7/36* (2006.01)
*F01D 15/10* (2006.01)
(Continued)

(52) U.S. Cl.
CPC ............... *F02C 7/36* (2013.01); *F01D 15/10* (2013.01); *F01D 15/12* (2013.01); *F02C 3/10* (2013.01);
(Continued)

(58) Field of Classification Search
CPC ....................................................... F02C 7/36
See application file for complete search history.

(56) References Cited

U.S. PATENT DOCUMENTS 4,380,897 A 4/1983 Zaba
6,334,369 B1 * 1/2002 Sandig .................. F16H 1/08
74/413

(Continued)

FOREIGN PATENT DOCUMENTS

DE 19808519 9/1999
JP 56-83525 7/1981
(Continued)

OTHER PUBLICATIONS

International Search Report dated Sep. 26, 2017 in International (PCT) Patent Application No. PCT/JP2017/031169, with English translation.

(Continued)

*Primary Examiner* — Gerald L Sung
(74) *Attorney, Agent, or Firm* — Wenderoth, Lind & Ponack, L.L.P.

(57) ABSTRACT

Provided is a two-shaft gas turbine power generation equipment that includes: an induction motor which receives/transmits power from/to a power system; and a speed reducer that makes a rotational speed of a motor rotor of the induction motor lower than a rotational speed of a compressor rotor of a two-shaft gas turbine. The speed reducer includes: a compressor-side shaft; a motor-side shaft; a first compressor-side helical gear and a second compressor-side helical gear which are mounted on the compressor-side shaft; and a first motor-side helical gear and a second motor-side helical gear which are mounted on the motor-side shaft. The first compressor-side helical gear meshes with the (Continued)

first motor-side helical gear, and the second compressor-side helical gear meshes with the second motor-side helical gear.

8 Claims, 6 Drawing Sheets

(51) Int. Cl.
    *F01D 15/12*     (2006.01)
    *F02C 3/10*     (2006.01)
    *F02C 7/275*     (2006.01)
    *H02P 9/04*     (2006.01)

(52) U.S. Cl.
    CPC ............... *F02C 7/275* (2013.01); *H02P 9/04* (2013.01); *F05D 2220/76* (2013.01); *F05D 2260/4031* (2013.01); *F05D 2260/85* (2013.01)

(56) References Cited

U.S. PATENT DOCUMENTS

| | | | |
|---|---|---|---|
| 2006/0150633 A1* | 7/2006 | McGinley | F02C 7/275 60/773 |
| 2009/0320438 A1 | 12/2009 | Koganezawa et al. | |
| 2013/0118146 A1 | 5/2013 | Nanataki et al. | |
| 2013/0192264 A1* | 8/2013 | McCune | F02K 3/06 60/805 |
| 2015/0171705 A1 | 6/2015 | Hino et al. | |
| 2015/0240931 A1* | 8/2015 | Venter | F16H 55/17 74/410 |
| 2017/0234235 A1* | 8/2017 | Pech | F02N 11/0862 290/31 |

FOREIGN PATENT DOCUMENTS

| | | |
|---|---|---|
| JP | 2003-083081 | 3/2003 |
| JP | 2010-65636 | 3/2010 |
| JP | 2013-104372 | 5/2013 |
| WO | 2014/002274 | 1/2014 |
| WO | 2014/020772 | 2/2014 |

OTHER PUBLICATIONS

Written Opinion of the International Searching Authority dated Sep. 26, 2017 in International (PCT) Patent Application No. PCT/JP2017/031169, with English translation.

* cited by examiner

TWO-SHAFT GAS TURBINE POWER GENERATION EQUIPMENT

TECHNICAL FIELD

The present disclosure relates to two-shaft gas turbine power generation equipment equipped with a two-shaft gas turbine and a power generator.

Priority is claimed on Japanese Patent Application No. 2016-169765, filed Aug. 31, 2016, the content of which is incorporated herein by reference.

BACKGROUND ART

Two-shaft gas turbine power generation equipment includes, for example, equipment disclosed in Patent Literature 1 below. This two-shaft gas turbine power generation equipment includes a two-shaft gas turbine, a power generator, a motor, and a frequency converter. In the two-shaft gas turbine power generation equipment disclosed in Patent Literature 1, a compressor rotor is mechanically coupled to a motor rotor of the motor via a speed reducer as needed.

A two-shaft gas turbine includes a compressor that compresses air to produce compressed air, a combustor that burns a fuel in the compressed air to produce a combustion gas, a high-pressure turbine that is driven by the combustion gas, and a low-pressure turbine that is driven by exhaust gas exhausted from the high-pressure turbine. A rotor of the high-pressure turbine and a compressor rotor are mechanically coupled to each other. Further, a rotor of the low-pressure turbine and a rotor of the power generator are mechanically coupled to each other. However, the rotor of the high-pressure turbine and the rotor of the low-pressure turbine are not mechanically coupled. Further, as described above, in the case where the compressor rotor is mechanically coupled to the motor rotor of the motor via the speed reducer, the speed reducer fulfills a role of making a rotational speed of the motor rotor slower than a rotational speed of the compressor rotor. In this way, the rotational speed of the motor rotor is reduced using the speed reducer so that a general-purpose motor can be used as the motor and equipment costs can be reduced.

In a case where demand output of the two-shaft gas turbine power generation equipment increases suddenly, even if output of the power generator is raised by increasing a flow rate of a fuel supplied to the combustor, the output of the power generator sometimes cannot follow the sudden increase of the demand output. Therefore, in the technique disclosed in Patent Literature 1, the motor is temporarily used as the power generator, and power that is generated by the motor and output from the motor makes up for a shortage of the output of the power generator against the demand output. Further, in a case where the demand output of the two-shaft gas turbine power generation equipment decreases suddenly, even if the output of the power generator is lowered by reducing the flow rate of the fuel supplied to the combustor, the output of the power generator sometimes cannot follow the sudden decrease of the demand output. Therefore, in the technique disclosed in Patent Literature 1, a surplus of the output of the power generator against the demand output is given to the motor via a power system. Accordingly, in the technique disclosed in Patent Literature 1, there are a case where the motor receives torque from the compressor side and a case where the motor gives torque to the compressor side. That is, in the technique disclosed in Patent Literature 1, in the case of the sudden increase or decrease of the demand output, a direction of torque transmission between the motor and the compressor is changed.

CITATION LIST

Patent Literature

[Patent Literature 1]
  PCT International Publication No. WO2014/020772

SUMMARY OF INVENTION

Technical Problem

The speed reducer generally has a plurality of gears. There is a gap called a backlash between a pair of gears meshing with each other. The two-shaft gas turbine power generation equipment disclosed in Patent Literature 1 includes the speed reducer, and if the speed reducer has a plurality of spur gears, when the direction of the torque transmission between the motor and the compressor is changed, responsiveness of the torque transmission is reduced due to the presence of the backlash. In the field of gas turbine power generation equipment, securing responsiveness when demand output is suddenly changed is an important issue.

Therefore, an object of the present invention is to provide a two-shaft gas turbine power generation equipment capable of minimally suppressing a delay of torque transmission when a direction of the torque transmission is changed while suppressing an allowable highest rotational speed required for a motor.

Solution to Problem

As an aspect of the invention for achieving the object, a two-shaft gas turbine power generation equipment includes: a compressor that has a compressor rotor and compresses air to produce compressed air by rotation of the compressor rotor; a combustor that burns a fuel along with the compressed air to produce a combustion gas; a high-pressure turbine which has a high-pressure turbine rotor that is mechanically coupled with the compressor rotor and in which the high-pressure turbine rotor is rotated by the combustion gas; a low-pressure turbine which has a low-pressure turbine rotor that is not coupled to the high-pressure turbine rotor and in which the low-pressure turbine rotor is rotated by the combustion gas exhausted from the high-pressure turbine; a power generator that produces power by rotation of the low-pressure turbine rotor and is electrically connected to a power system to which alternating current power flows; an induction motor that is electrically connected to the power system in parallel with the power generator and receives/transmits power from/to the power system; a frequency converter that is provided between the induction motor and the power system in an electrical connection relationship, controls reception/transmission of power between the induction motor and the power system, converts a frequency of the power from the induction motor into a frequency of the power system when the power from the induction motor is transmitted toward the power system, and converts a frequency of the power from the power system to a frequency of the induction motor when the power from the vicinity of the power system is received and supplied to the induction motor; and a speed reducer that makes a rotational speed of the motor rotor of the induction motor slower than a rotation speed of the compressor rotor.

The speed reducer has: a compressor-side shaft that is mechanically coupled with the compressor rotor; a motor-side shaft that is disposed parallel to the compressor-side shaft at an interval and is mechanically coupled with the motor rotor; a first compressor-side helical gear that is mounted on the compressor-side shaft and is rotated integrally with the compressor-side shaft: a first motor-side helical gear that is mounted on the motor-side shaft, is rotated integrally with the motor-side shaft, and meshes with the first compressor-side helical gear; a second compressor-side helical gear that is mounted on the compressor-side shaft and is rotated integrally with the compressor-side shaft; and a second motor-side helical gear that is mounted on the motor-side shaft, is rotated integrally with the motor-side shaft, and meshes with the second compressor-side helical gear.

In the two-shaft gas turbine power generation equipment, since helical gears are used as the gears of the speed reducer, a time until the compressor-side gears come into contact with the motor-side gears when a direction of torque transmission between the compressor-side shaft and the motor-side shaft is changed even, for example, in a case where spur gears are used as the gears of the speed reducer can be shortened. Accordingly, in the two-shaft gas turbine power generation equipment, a delay of the torque transmission when the direction of the torque transmission is changed can be minimized.

Here, in the two-shaft gas turbine power generation equipment, the induction motor may be a motor having a characteristic that output thereof is monotonously increased or reduced with respect to a change in rotational speed thereof in a rotational speed range including a rotational speed obtained by multiplying a rated rotational speed predetermined for the high-pressure turbine rotor by a reduction ratio based on the speed reducer.

In the two-shaft gas turbine power generation equipment, management of motor output when function switching between a state where the induction motor functions as a power generator and a state where the induction motor functions as a motor is performed can be easily performed.

Further, in the two-shaft gas turbine power generation equipment, the rated rotational speed of the high-pressure turbine rotor may range from 4000 rpm to 7000 rpm.

Further, in any one of the above types of two-shaft gas turbine power generation equipment, a reduction ratio of the speed reducer may range from 9/10 to 1/5. Further, in any one of the above types of two-shaft gas turbine power generation equipment, the reduction ratio of the speed reducer may be a reduction ratio by which a rotational speed of the motor rotor is adjusted to a rotational speed of the power generator.

Further, in any one of the above types of two-shaft gas turbine power generation equipment, a direction of a twist of each tooth trace of the second compressor-side helical gear may be opposite to that of a twist of each tooth trace of the first compressor-side helical gear.

In the two-shaft gas turbine power generation equipment, at least part of a thrust force generated between the first compressor-side helical gear and the first motor-side helical gear can be offset by a thrust force generated between the second compressor-side helical gear and the second motor-side helical gear.

Further, in any one of the above types of two-shaft gas turbine power generation equipment, the number of teeth of the second compressor-side helical gear may be different from that of the first compressor-side helical gear.

In the two-shaft gas turbine power generation equipment, the delay of the torque transmission when the direction of the torque transmission is changed can be further suppressed.

Further, in any one of the above types of two-shaft gas turbine power generation equipment, the speed reducer may have one of a compressor-side coupling tool that mounts the first and second compressor-side helical gears to be non-rotatable relative to the compressor-side shaft and to be movable relative to the compressor-side shaft in a thrust direction in which the compressor-side shaft extends, and a motor-side coupling tool that mounts the first and second motor-side helical gears to be non-rotatable relative to the motor-side shaft and to be movable relative to the compressor-side shaft in a thrust direction in which the motor-side shaft extends.

In the two-shaft gas turbine power generation equipment, movement of the motor-side shaft in the thrust direction and movement of the motor rotor in the thrust direction can be suppressed against the movement of the compressor-side shaft in the thrust direction.

Further, any one of the above types of two-shaft gas turbine power generation equipment may include a coupling that mechanically couples the compressor rotor and the compressor-side shaft. The coupling may have a displacement absorber that absorbs displacement of the compressor rotor in at least one of a thrust direction of the compressor rotor and a radial direction of the compressor rotor.

In the two-shaft gas turbine power generation equipment, even if an end of the compressor rotor is displaced in a thrust direction or in a radial direction, the displacement can be absorbed by the coupling.

Further, the coupling may be a diaphragm coupling.

Advantageous Effects of Invention

According to the aspect of the present invention, a delay of torque transmission when a direction of the torque transmission is changed can be minimized while suppressing an allowable maximum rotational speed required of the motor.

DESCRIPTION OF EMBODIMENTS

Hereinafter, an embodiment of a two-shaft gas turbine power generation equipment according to the present invention will be described in detail with reference to the drawings.

Figure 1:
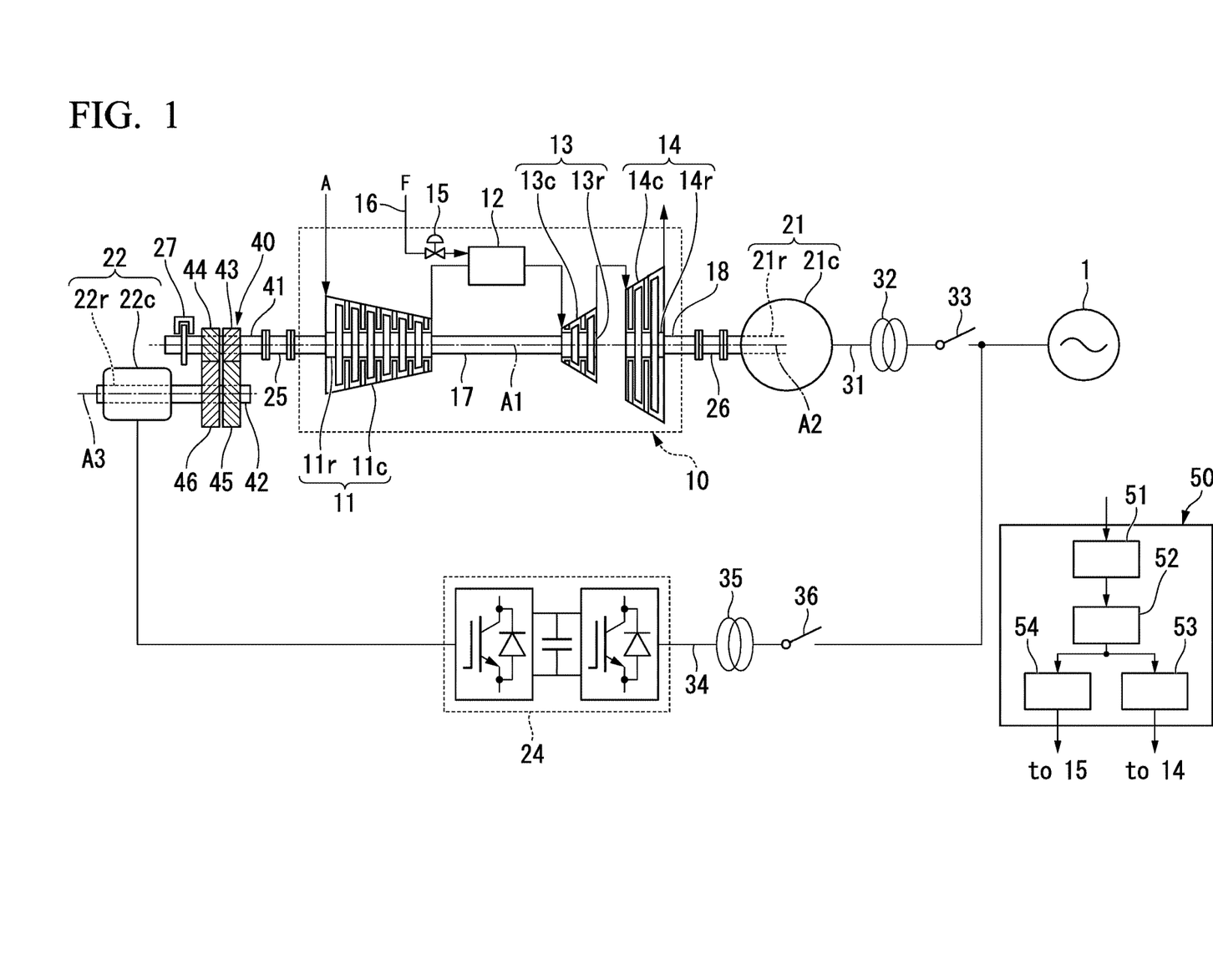
FIG. 1 is a system diagram of two-shaft gas turbine power generation equipment in an embodiment of the present invention.

As illustrated in FIG. 1, a two-shaft gas turbine power generation equipment of the present embodiment includes a two-shaft gas turbine 10, a power generator 21, an induction motor 22, a frequency converter 24 that controls transmission/reception of power between the induction motor 22 and a power system 1, a speed reducer 40, and a control unit 50.

The two-shaft gas turbine 10 includes a compressor 11 that compresses air A to produce compressed air, a combustor 12 that burns a fuel F in the compressed air to produce a combustion gas, a fuel regulating valve 15 that regulates a flow rate of the fuel F supplied to the combustor 12, a high-pressure turbine 13 that is driven by the combustion gas from the combustor 12, and a low-pressure turbine 14 that is driven by a combustion gas exhausted from the high-pressure turbine 13.

The compressor 11 has a compressor rotor 11r that rotates about a first axis A1 and a compressor casing 11c that covers the compressor rotor 11r. The high-pressure turbine 13 has a high-pressure turbine rotor 13r that rotates about the first axis A1 and a high-pressure turbine casing 13c that covers the high-pressure turbine rotor 13r. Both the compressor rotor 11r and the high-pressure turbine rotor 13r are located on the first axis A1 and are mutually coupled to constitute a first rotor 17. The low-pressure turbine 14 has a low-pressure turbine rotor 14r that rotates about a second axis A2 and a low-pressure turbine casing 14c that covers the low-pressure turbine rotor 14r. The combustor 12 is connected to a fuel supply source by a fuel line 16. A fuel regulating valve 15 is provided on the fuel line 16.

The induction motor 22 has a motor rotor 22r that rotates about a third axis A3 parallel with the first axis A1 and a motor casing 22c that covers the motor rotor 22r. The motor rotor 22r is mechanically coupled to the compressor rotor 11r via the speed reducer 40.

The speed reducer 40 makes a rotational speed of the compressor rotor 11r slower than a rotational speed of the motor rotor 22r. To be specific, in a case where the compressor rotor 11r and the high-pressure turbine rotor 13r have a rated speed of 4000 rpm to 7000 rpm, the speed reducer 40 adjusts the rotational speed of the motor rotor 22r to, for example, about 3600 rpm to 1600 rpm with respect to the rated speed. Accordingly, a reduction ratio of the speed reducer 40 is, for example, about 9/10 to 1/5.

The speed reducer 40 has a compressor-side shaft 41, a motor-side shaft 42, a first compressor-side helical gear 43, a first motor-side helical gear 45, a second compressor-side helical gear 44, and a second motor-side helical gear 46. The compressor-side shaft 41 is mechanically coupled with the compressor rotor 11r via a first diaphragm coupling 25. The compressor-side shaft 41 is located on an extension line of the compressor rotor 11r and practically rotates about the first axis A1. The motor-side shaft 42 is directly coupled to the motor rotor 22r. The motor-side shaft 42 is located on an extension line of the motor rotor 22r and rotates about the third axis A3. Accordingly, the motor-side shaft 42 is disposed parallel to the compressor-side shaft 41 at an interval. Both the first compressor-side helical gear 43 and the second compressor-side helical gear 44 are mounted on the compressor-side shaft 41 and rotated integrally with the compressor-side shaft 41. Both the first motor-side helical gear 45 and the second motor-side helical gear 46 are mounted on the motor-side shaft 42 and rotated integrally with the motor-side shaft 42. The first compressor-side helical gear 43 is meshing with the first motor-side helical gear 45. Further, the second compressor-side helical gear 44 is meshing with the second motor-side helical gear 46.

The power generator 21 has a power generator rotor 21r that rotates about the second axis A2 and a power generator casing 21c that covers the power generator rotor 21r. The power generator 21 is a synchronous power generator. A rated rotational speed of the power generator 21 is, for example, 3000 rpm or 3600 rpm. In a case where a rotational speed of the power generator 21 is a rated rotational speed, the speed reducer 40 adjusts the rotational speed of the motor rotor 22r to nearly a rated speed of the synchronous power generator 21 (3000 rpm or 3600 rpm). Both the power generator rotor 21r and the low-pressure turbine rotor 14r are located on the second axis A2, mutually coupled via a second diaphragm coupling 26, and constitute a second rotor 18. The second rotor 18 is not coupled to the first rotor 17. For this reason, the second rotor 18 can be rotated independently of the rotation of the first rotor 17.

The power generator 21 is electrically connected to the power system 1 by a primary power path 31. A transformer 32 and a circuit breaker 33 are provided on the primary power path 31. The induction motor 22 is electrically connected to the power system 1 by a secondary power path 34 in parallel with the power generator 21. The frequency converter 24, a transformer 35, and a circuit breaker 36 are provided on the secondary power path 34. The transformer 35 and the circuit breaker 36 are provided closer to the power system 1 than the frequency converter 24.

When transmitting power from the induction motor 22 to the vicinity of the power system 1, the frequency converter 24 converts a frequency of the power from the induction motor 22 into a frequency of the power system 1. Further, when receiving power from the vicinity of the power system 1 and supplying the received power to the induction motor 22, the frequency converter 24 converts a frequency of the power of the power system 1 into a frequency of the induction motor 22. Accordingly, the induction motor 22 takes charge of a function as the motor that rotates the first rotor 17 and a function as the power generator. For this reason, the induction motor 22 is switched from a state where it takes charge of a function as the motor to a state where it takes charge of a function as the power generator and is simultaneously switched from a state where it takes charge of a function as the power generator to a state where it takes charge of a function as the motor. In this way, in the induction motor 22 whose function is switched, output of the motor at the time of switching may be linearly changed with respect to a change in rotational speed of the motor in view of output management of the motor. The function switching of the induction motor 22 occurs in a mode where the power generator 21 transmits power to the power system 1 (hereinafter, this mode is referred to as a power generation mode). Therefore, in the present embodiment, a motor having a characteristic that output thereof is monotonously reduced or increased with respect to a change in rotational speed thereof in a range of the rotational speed of the induction motor 22 in the power generation mode is used as the induction motor 22. To be specific, in a case where, in the power generation mode, the rotational speed of the compressor rotor 11r is about 6000 rpm, and simultaneously the rotational speed of the motor rotor 22r is, for example, about 3000 rpm, a motor having a characteristic that output thereof is monotonously reduced or increased with respect to a change in rotational speed thereof in a range of a rotational speed of 3000 rpm±20% is preferably used.

The control unit 50 has a receiver 51 that receives output from various instruments and various pieces of information or the like from the outside, a determiner 52 that performs various types of determination, a fuel controller 54 that controls a degree of opening of the fuel regulating valve 15, and a conversion controller 53 that controls the frequency converter 24.

The control unit 50 is made up of a computer. The receiver 51 and the controllers 53 and 54 are made up of an input/output interface of the computer, a central processing unit (CPU) that performs various operations, a memory in which programs executed by the CPU are stored, and so on. The determiner 52 is made up of a CPU, a memory, etc. of the computer.

Figure 2:
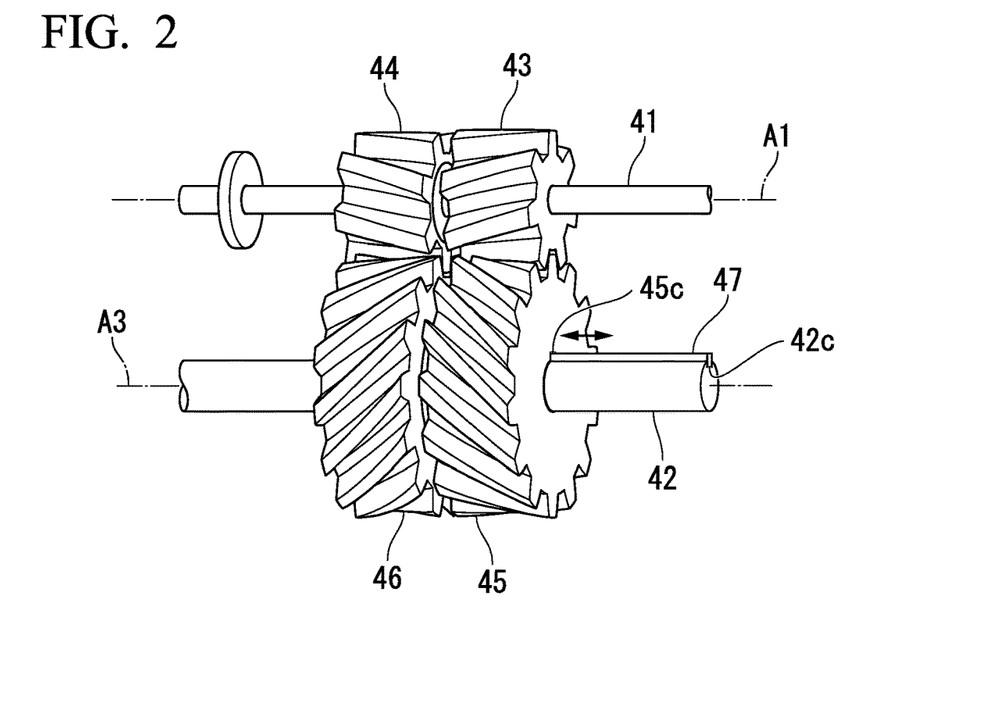
FIG. 2 is a perspective view of a speed reducer in the embodiment of the present invention.

As illustrated in FIG. 2, each helical gear is a gear formed with each tooth trace thereof twisted obliquely with respect to an axis thereof. A direction of a twist of each tooth trace of a first motor-side helical gear 45 meshing with a first compressor-side helical gear 43 is opposite to that of a twist of each tooth trace of the first compressor-side helical gear 43. Further, a direction of the twist of each tooth trace of a second motor-side helical gear 46 meshing with a second compressor-side helical gear 44 is opposite to that of the twist of each tooth trace of the second compressor-side helical gear 44. Further, the direction of the twist of each tooth trace of the second compressor-side helical gear 44 is opposite to that of the twist of each tooth trace of the first compressor-side helical gear 43. Accordingly, the direction of the twist of each tooth trace of a second motor-side helical gear 46 is opposite to that of the twist of each tooth trace of the first motor-side helical gear 45. However, twist angles of the tooth traces of the four helical gears are the same as each other.

The number of teeth of the second compressor-side helical gear 44 is the same as that of the first compressor-side helical gear 43. The number of teeth of the second motor-side helical gear 46 is the same as that of the first motor-side helical gear 45. In a case where the rotational speed of the compressor rotor 11r is set to about 6000 rpm and the rotational speed of the motor rotor 22r is set to about 3000 rpm, the number of teeth of the first motor-side helical gear 45 is about twice as many as that of the first compressor-side helical gear 43, and the number of teeth of the second motor-side helical gear 46 is about twice as many as that of the second compressor-side helical gear 44.

Key grooves 45c, which are recessed outward in a radial direction with respect to the third axis A3 and extend in an axial direction, are formed in inner circumferential surfaces of shaft insertion holes of the first and second motor-side helical gears 45 and 46. Further, a key groove 42c, which is recessed inward in the radial direction with respect to the third axis A3 and extends in the axial direction, is formed in an outer circumferential surface of the motor-side shaft 42. A single key (a motor-side coupling tool) 47 is inserted into the key groove 45c of the first motor-side helical gear 45, the key groove 45c of the second motor-side helical gear 46, and the key groove 42c of the motor-side shaft 42. Due to a structure of the key, both the first motor-side helical gear 45 and the second motor-side helical gear 46 are mounted on the motor-side shaft 42 such that they cannot rotate relative to the motor-side shaft 42 and can move relative to the motor-side shaft 42 in an axial direction (a thrust direction) in which the third axis A3 extends. In the present embodiment, the second motor-side helical gear 46 is coupled to be immovable relative to the first motor-side helical gear 45 in the axial direction.

Both the first compressor-side helical gear 43 and the second compressor-side helical gear 44 are mounted on the compressor-side shaft 41 such that they cannot rotate relative to the compressor-side shaft 41 and cannot move relatively in an axial direction in which the first axis A1 extends. To mount the first and second compressor-side helical gears 43 and 44 on the compressor-side shaft 41 as described above, there is, for example, a method of adopting the aforementioned key structure and screwing a retaining nut or the like into the compressor-side shaft 41.

Figure 6:
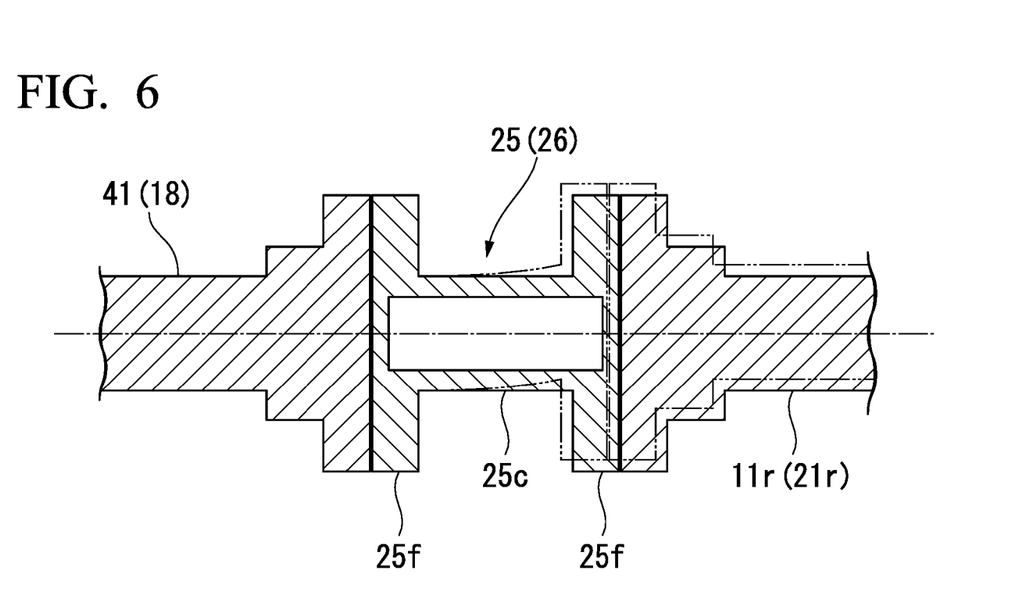
FIG. 6 is a schematic sectional view of a diaphragm coupling in the embodiment of the present invention.

As illustrated in FIG. 6, both the first diaphragm coupling 25 and the second diaphragm coupling 26 each have a pair of flanges 25f and a center tube 25c. The center tube 25c is disposed between the pair of flanges 25f and mutually couples the pair of flanges 25f. The center tube (the displacement absorber) 25c is a structure that has high twist rigidity but is flexible with respect to flexure and compression. For this reason, when the compressor-side shaft 41 of the speed reducer 40 and the compressor rotor 11r are coupled using the first diaphragm coupling 25, torque of the compressor-side shaft 41 can be practically transmitted to the compressor rotor 11r without any waste. Further, in a case where the compressor rotor 11r is thermally expanded and a position of an end of the compressor rotor 11r is displaced, or in a case where the compressor-side shaft 41 is shifted with respect to the compressor rotor 11r in a radial direction, the first diaphragm coupling 25 can absorb the displacement or the like of the compressor rotor 11r or the compressor-side shaft 41. Further, when the second rotor 18 and the power generator rotor 21r are coupled using the second diaphragm coupling 26, torque of the second rotor 18 can be practically transmitted to the power generator rotor 21r without any waste. Further, in a case where the second rotor 18 is thermally expanded and a position of an end of the second rotor 18 is displaced, or in a case where the power generator rotor 21r is shifted with respect to the second rotor 18 in a radial direction, the second diaphragm coupling 26 can absorb the displacement or the like of the second rotor 18 or the power generator rotor 21r.

Here, the diaphragm coupling is used. However, as long as a coupling can absorb the expansion of the shaft or the rotor and the shift or the like of the shaft or the rotor, the coupling may not be especially the diaphragm coupling.

Next, an operation of the two-shaft gas turbine power generation equipment described above will be described.

As illustrated in FIG. 1, the compressor 11 of the two-shaft gas turbine 10 compresses air A and supplies the compressed air A to the combustor 12. A fuel F is also supplied to the combustor 12 in addition to the compressed air A. The fuel F is burned in the combustor 12 along with the compressed air A. and a high-temperature high-pressure combustion gas is produced. The combustion gas is sent from the combustor 12 into the high-pressure turbine casing 13c and rotates the high-pressure turbine rotor 13r. A rotational driving force generated by the high-pressure turbine 13 is used for rotation of the compressor rotor 11r. The combustion gas that has rotated the high-pressure turbine rotor 13r is exhausted from the high-pressure turbine casing 13c and flows into the low-pressure turbine casing 14c. The combustion gas rotates the low-pressure turbine rotor 14r. Due to the rotation of the low-pressure turbine rotor 14r, the power generator rotor 21r coupled with the low-pressure turbine rotor 14r is also rotated. As a result, the power generator 21 produces electric power. The power from the power generator 21 is sent to the power system 1 via the primary power path 31.

When a start instruction is input into the receiver 51 of the control unit 50, the conversion controller 53 of the control unit 50 controls the frequency converter 24, for example, in a predetermined start pattern, until the two-shaft gas turbine 10 shifts to a power generation mode. Further, the fuel controller 54 of the control unit 50 controls a degree of opening of the fuel regulating valve 15, for example, in a predetermined start pattern, until the two-shaft gas turbine 10 shifts to a power generation mode.

To be specific, the conversion controller 53 causes the frequency converter 24 to receive power from the power system 1 and sends this power to the induction motor 22. In this case, the frequency converter 24 gradually increases a frequency of the power sent to the induction motor 22 according to the instruction from the conversion controller 53. Consequently, the first rotor 17 of the two-shaft gas turbine 10 starts to rotate, and a rotational speed of the first rotor 17 gradually increases. When the rotational speed of the first rotor 17 is faster than or equal to a prescribed rotational speed, the fuel controller 54 opens the fuel regulating valve 15 and gradually enlarges a degree of opening of the fuel regulating valve 15. As a result, fuel supply to the combustor 12 is initiated, and an amount of the fuel supply to the combustor 12 gradually increases. In this case, since the compressor rotor 11r is also rotated at or above a prescribed rotational speed, the compressor 11 compresses air A and supplies the compressed air to the combustor 12. With an increase in the rotational speed of the compressor rotor 11r, a pressure of the compressed air increases, and simultaneously a flow rate of the compressed air supplied to the combustor 12 also increases. A fuel F is burned in the combustor 12 along with the compressed air so that a high-temperature high-pressure combustion gas is produced. The combustion gas is sent from the combustor 12 into the high-pressure turbine casing 13c and rotates the high-pressure turbine rotor 13r. A rotational driving force generated by the high-pressure turbine 13 is used for the rotation of the compressor rotor 11r. The combustion gas that has rotated the high-pressure turbine rotor 13r is exhausted from the high-pressure turbine casing 13c and flows into the low-pressure turbine casing 14c. The combustion gas rotates the low-pressure turbine rotor 14r.

When an amount of the combustion gas generated increases in the combustor 12 in association with the increase of the amount of the fuel supply and the rotational speed of the high-pressure turbine rotor 13r increases, the first rotor 17 including the high-pressure turbine rotor 13r and the compressor rotor 11r can rotate self-sustainably. In this state, power supply from the power system 1 to the induction motor 22 is terminated. Even after the termination, an amount of fuel supply increases, and rotational speeds of the first and second rotors 17 and 18 further increase. When the rotational speed of the second rotor 18, that is, the rotational speed of the low-pressure turbine rotor 14r and the rotational speed of the power generator rotor 21r, reaches, for example, 3000 rpm, the circuit breaker 33 is closed, and the power generator 21 is combined with the power system 1. Consequently, power generated by rotation of the power generator rotor 21r is sent to the power system 1.

When the power generator 21 is combined with the power system 1, a start mode of the two-shaft gas turbine 10 is terminated and shifts to a power generation mode.

In the power generation mode, the control unit 50 basically controls the frequency converter 24, the fuel regulating valve 15, etc. according to demand output DP or the like from the outside.

A maximum output change rate dGPmax is determined with respect to an output change rate of the two-shaft gas turbine 10, that is, an output change rate of the power generator 21 in view of protection or the like of the high-pressure and low-pressure turbines 13 and 14. Here, the output change rate is a rate of change per unit time of output. The maximum output change rate dGPmax includes a positive maximum output change rate dGPmax when output increases and a negative maximum output change rate dGPmax when output decreases. Further, the demand output change rate dDP also includes a positive demand output change rate dDP when the demand output DP increases and a negative demand output change rate dDP when the demand output DP decreases.

In a case where the demand output change rate dDP is zero (0), that is, the demand output DP is not changed, the fuel controller 54 determines a fuel flow rate such that the power generator output GP becomes output fitted to the demand output DP and instructs the fuel regulating valve 15 about a degree of opening corresponding to the fuel flow rate. In a case where an absolute value of the demand output change rate dDP is smaller than or equal to that of the maximum output change rate dGPmax of the power generator 21, the fuel controller 54 determines a fuel flow rate such that a rate of change of the power generator output GP is fitted to the demand output change rate dDP and instructs the fuel regulating valve 15 about a degree of opening corresponding to the fuel flow rate. In a case where an absolute value of the demand output change rate dDP is greater than that of the maximum output change rate dGPmax of the power generator 21, the fuel controller 54 determines a fuel flow rate such that a rate of change of the power generator output GP is fitted to the maximum output change rate dGPmax of the power generator output GP and instructs the fuel regulating valve 15 about a degree of opening corresponding to the fuel flow rate. However, the fuel controller 54 determines the fuel flow rate first such that the power generator output GP becomes output fitted to the demand output DP without comparing a magnitude relationship between the absolute value of the demand output change rate dDP and the absolute value of the maximum output change rate dGPmax of the power generator 21. Afterward, the fuel controller 54 imposes restrictions on a rate of change of the fuel flow rate and instructs the fuel regulating valve 15 about a degree of opening corresponding to the restricted fuel flow rate.

The determiner 52 of the control unit 50 determines whether or not the absolute value of the demand output change rate dDP is greater than that of the maximum output change rate dGPmax of the power generator 21. When the determiner 52 determines that the absolute value of the demand output change rate dDP is greater than that of the maximum output change rate dGPmax of the power generator 21, the determiner 52 determines whether or not a rate of change of the demand output DP which the receiver 51 receives is positive, that is, whether the demand output DP suddenly increases or decreases, and notifies the conversion controller 53 of a result of the determination.

Figure 7:
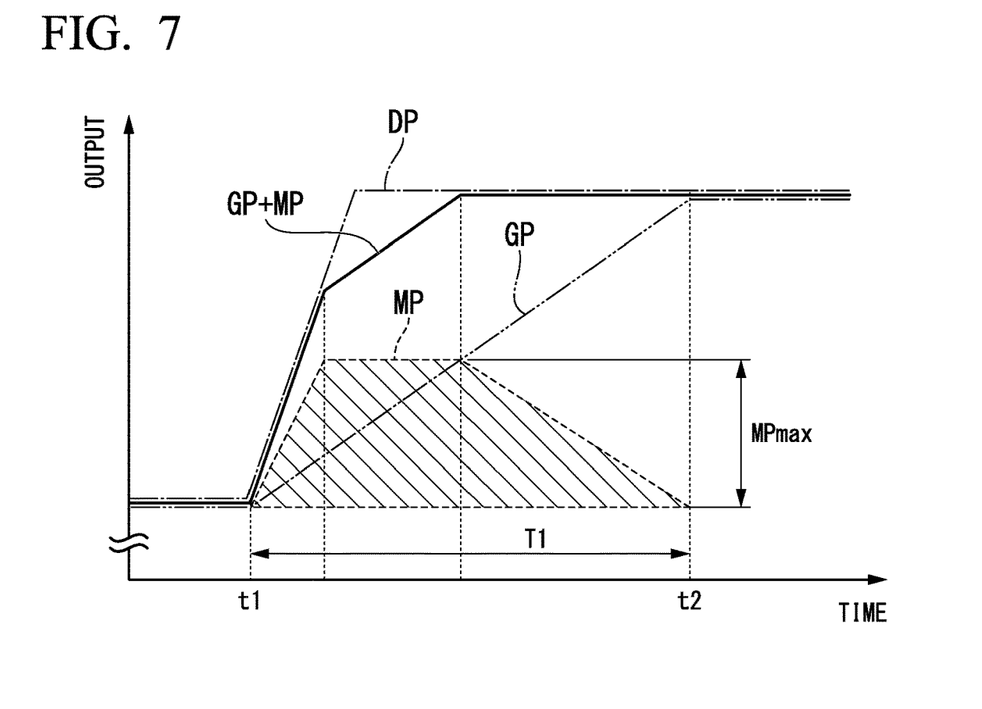
FIG. 7 is an explanatory view illustrating a change in output when suddenly increasing request output is received in the embodiment of the present invention.

In the case where the demand output DP suddenly increases, the conversion controller 53 causes the frequency converter 24 to transmit power MP from the induction motor 22 to the power system 1. In this case, as illustrated in FIG. 7, the conversion controller 53 causes the frequency converter 24 to control the power MP to be transmitted from the induction motor 22 to the power system 1 such that a value (=GP+MP) obtained by adding the power generator output GP at each time after the demand output DP is received and the power MP to be transmitted from the induction motor 22 to the power system 1 at the same time becomes the demand output DP at the same time. For this reason, in the case where the demand output DP suddenly increases, the power MP to be transmitted from the induction motor 22 to the power system 1 increases with the lapse of time at first. An energy source of the power MP received/transmitted by the induction motor 22 is the first rotor 17 and rotational inertial energy of a rotating system that is mechanically coupled to the first rotor 17. For this reason, there is a limit to an amount of the power received/transmitted by the induction motor 22. Accordingly, the power MP to be transmitted from the induction motor 22 to the power system 1 increases at first, becomes maximum allowable output MPmax of the induction motor 22, and is then reduced.

In this way, in a case where the power generator output GP cannot follow the sudden increase of the demand output DP, the induction motor 22 is temporarily used as a power generator in the present embodiment, the power MP that is generated by the induction motor 22 and is output from the induction motor 22 makes up for a shortage of the power generator output GP against the demand output DP.

In the case where the demand output DP suddenly decreases, the conversion controller 53 causes the frequency converter 24 to supply the power MP received from the power system 1 to the induction motor 22. In this case, the conversion controller 53 causes the frequency converter 24 to control the power MP to be supplied to the induction motor 22 such that a value (=GP+MP (<0)) obtained by adding the power generator output GP at each time after the demand output DP is received and the power MP (whose value is a negative value in this case) to be received from the power system 1 and to be supplied to the induction motor 22 at the same time becomes the demand output DP at the same time. For this reason, in the case where the demand output DP suddenly decreases, the power MP to be received from the power system 1 and supplied to the induction motor 22 increases at first, becomes the maximum allowable output MPmax of the induction motor 22, and is then reduced.

In this way, in a case where the power generator output GP cannot follow the sudden decrease of the demand output DP, the power MP from the power system 1 is supplied to the induction motor 22 in the present embodiment, and a surplus of the power generator output GP against the demand output DP is given to the induction motor 22 via the power system 1.

As described above, in the present embodiment, there are a case where the induction motor 22 receives torque from the vicinity of the compressor and a case where the induction motor 22 transmits the torque to the vicinity of the compressor. That is, in the present embodiment, a direction of torque transmission between the induction motor 22 and the compressor is changed.

In the present embodiment, to suppress an allowable maximum rotational speed of the induction motor 22, the speed reducer 40 is interposed between the induction motor 22 and the compressor 11. There is a gap called a backlash between a pair of gears meshing with each other in the speed reducer. If the speed reducer has a plurality of spur gears, when the direction of the torque transmission between the induction motor 22 and the compressor 11 is changed, responsiveness of the torque transmission is reduced due to the presence of the backlash.

Figure 3:
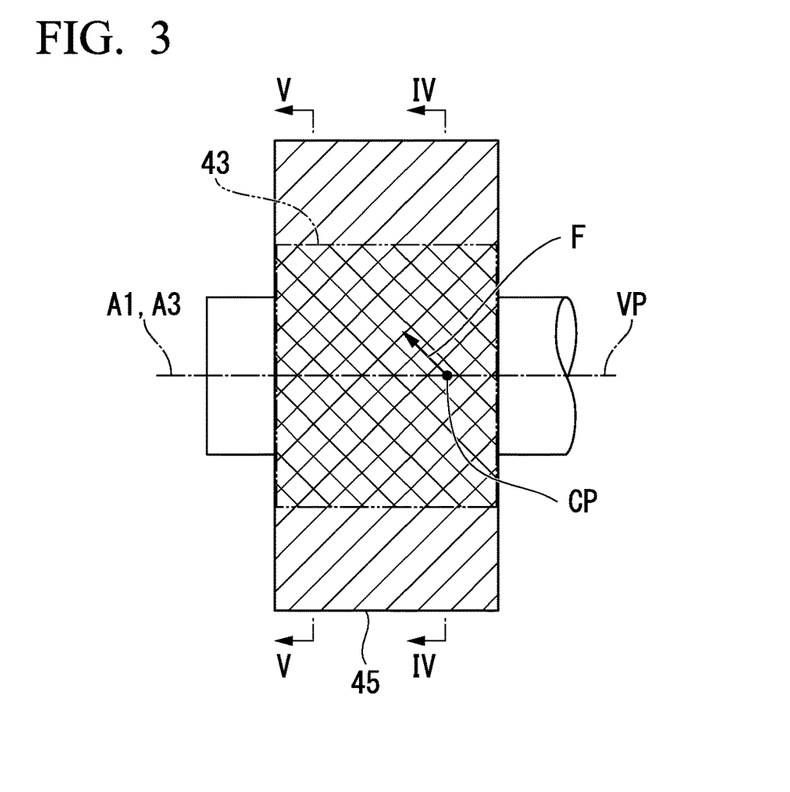
FIG. 3 is a schematic top view of a first motor-side helical gear in the embodiment of the present invention.
Figure 4:
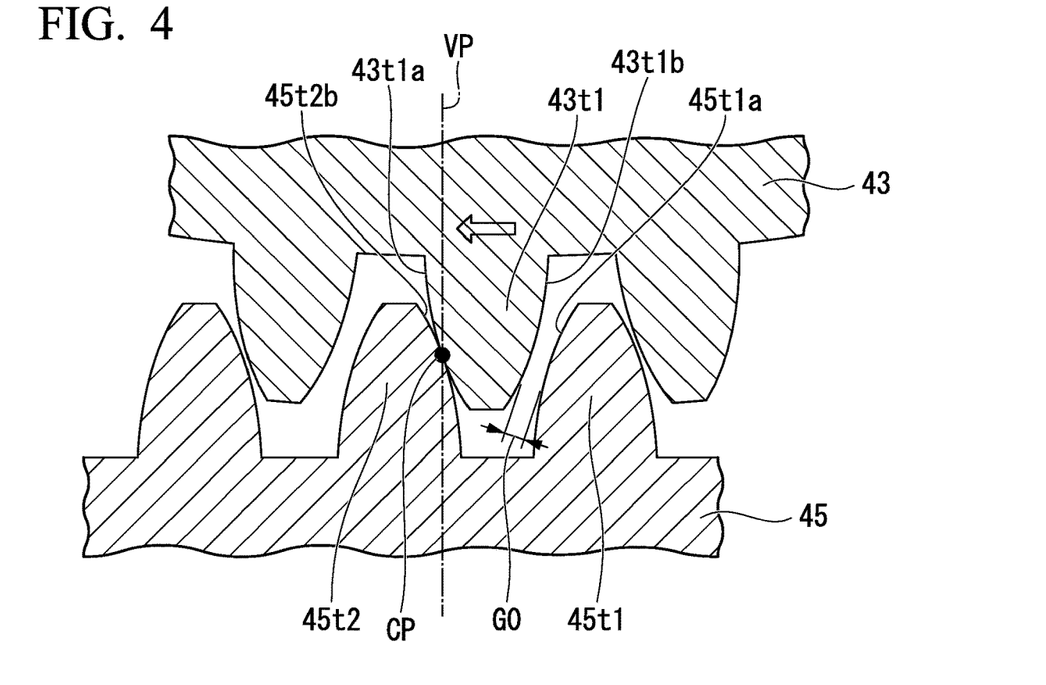
FIG. 4 is a sectional view taken along line IV-IV in FIG. 3.

The speed reducer 40 of the present embodiment uses helical gears as a plurality of gears. As illustrated in FIGS. 3 and 4, a pair of helical gears meshing with each other are consistently in point contact with each other in a virtual plane VP including a central axis of each helical gear. That is, in the present embodiment, a point of a tooth face crossing a virtual plane VP among a plurality of tooth faces of the first compressor-side helical gear 43 is consistently in point contact with a point of a tooth face crossing the virtual plane VP among a plurality of tooth faces of the first motor-side helical gear 45.

For the time being, torque is considered to be transmitted from the first compressor-side helical gear 43 to the first motor-side helical gear 45. A first tooth (hereinafter referred to as a first compressor-side tooth) $43t1$ among a plurality of teeth of the first compressor-side helical gear 43 is considered to be located between a first tooth (hereinafter referred to as a first motor-side tooth) $45t1$ and a second tooth (hereinafter referred to as a second motor-side tooth) $45t2$ among a plurality of teeth of the first motor-side helical gear 45. Furthermore, a point of a rotation-side tooth face $43t1a$ of the first compressor-side tooth $43t1$ and a point of a counter-rotation-side tooth face $45t2b$ of the second motor-side tooth $45t2$ are all considered to be located on the virtual plane VP and be in contact with each other. In this case, a gap G0 called a backlash exists between a counter-rotation-side tooth face $43t1b$ of the first compressor-side tooth $43t1$ and a rotation-side tooth face $45t1a$ of the first motor-side tooth $45t1$.

Figure 5:
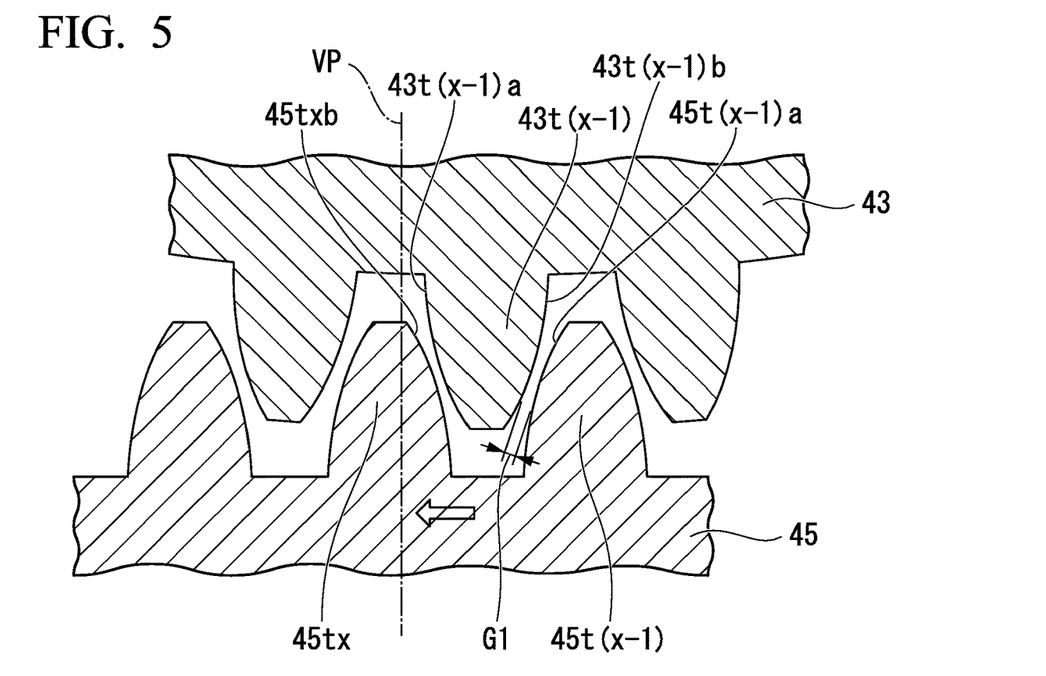
FIG. 5 is a sectional view taken along line V-V in FIG. 3.

In the above case, the first compressor-side helical gear 43 and the first motor-side helical gear 45 are not in contact with each other except for a contact point CP between the rotation-side tooth face $45t1a$ of the first compressor-side tooth $43t1$ and the counter-rotation-side tooth face $45t2b$ of the second motor-side tooth $45t2$. Accordingly, in the above case, as illustrated in FIGS. 3 and 5, an x-th tooth (hereinafter referred to as an x-th motor-side tooth) $45tx$ located at a position shifted from the contact point CP within the virtual plane VP in an axial direction among the plurality of teeth of the first motor-side helical gear 45 is not in contact with any tooth of the first compressor-side helical gear 43. Here, a tooth that is adjacent to the x-th motor-side tooth $45tx$ on a counter-rotation side among the plurality of teeth of the first motor-side helical gear 45 is set as an (x−1)-th motor-side tooth $45t(x-1)$, and a tooth that exists between the x-th motor-side tooth $45tx$ and the (x−1)-th motor-side tooth $45t(x-1)$ of the first motor-side helical gear 45 among the plurality of teeth of the first compressor-side helical gear 43 is set as an (x−1)-th compressor-side tooth $43t(x-1)$. There is a gap between a counter-rotation-side tooth face $45txb$ of the x-th motor-side tooth $45tx$ and a rotation-side tooth face $43t(x-1)a$ of the (x−1)-th compressor-side tooth $43t(x-1)$. Furthermore, there is also a gap G1 between a counter-rotation-side tooth face $43t(x-1)b$ of the (x−1)-th compressor-side tooth $43t(x-1)$ and a rotation-side tooth face $45t(x-1)a$ of the (x−1)-th motor-side tooth $45t(x-1)$. A dimension of the gap G1 is smaller than that of the aforementioned backlash G0.

In the above state, the direction of the torque transmission is considered to be changed from the first motor-side helical gear 45 to the first compressor-side helical gear 43. In a case where torque is transmitted from the first motor-side helical gear 45 to the first compressor-side helical gear 43, the rotation-side tooth face $45ta$ of the first motor-side helical gear 45 comes into point contact with the counter-rotation-side tooth face $43tb$ of the first compressor-side helical gear 43. That is, the rotation-side tooth face $45t(x-1)a$ of the (x−1)-th motor-side tooth 45*t*(x−1) comes into point contact with the counter-rotation-side tooth face 43*t*(x−1)b of the (x−1)-th compressor-side tooth 43*t*(x−1). As described above, just before the direction of the torque transmission is changed, the dimension of the gap G1 between the counter-rotation-side tooth face 43*t*(x−1)b of the (x−1)-th compressor-side tooth 43*t*(x−1) and the rotation-side tooth face 45*t*(x−1)a of the (x−1)-th motor-side tooth 45*t*(x−1) is smaller than that of the backlash G0. For this reason, a time until the counter-rotation-side tooth face 43*t*(x−1)b of the (x−1)-th compressor-side tooth 43*t*(x−1) comes into contact with the rotation-side tooth face 45*t*(x−1)a of the (x−1)-th motor-side tooth 45*t*(x−1) is reduced.

Accordingly, in the present embodiment, a delay of the torque transmission when the direction of the torque transmission is changed can be minimized.

Meanwhile, as described above, each helical gear is a gear formed with each tooth trace thereof twisted obliquely with respect to an axis thereof. For this reason, as illustrated in FIG. 3, a force F inclined with respect to an axis acts between the pair of helical gears meshing with each other. Accordingly, among component forces of this force, an axial force, that is, a thrust force, acts between the pair of helical gears. A bearing for bearing the shaft on which each helical gear is provided needs to receive the thrust force acting between the pair of helical gears.

In the present embodiment, in addition to the first compressor-side helical gear 43 and the first motor-side helical gear 45 that mesh with each other, the second compressor-side helical gear 44 and the second motor-side helical gear 46 that mesh with each other are provided. Furthermore, the direction of the twist of each tooth trace of the second compressor-side helical gear 44 is opposite to that of the twist of each tooth trace of the first compressor-side helical gear 43, and the direction of the twist of each tooth trace of the second motor-side helical gear 46 is opposite to that of the twist of each tooth trace of the first motor-side helical gear 45. For this reason, in the present embodiment, a thrust force acting between the second compressor-side helical gear 44 and the second motor-side helical gear 46 that mesh with each other becomes opposite to a thrust force acting between the first compressor-side helical gear 43 and the first motor-side helical gear 45 that mesh with each other. Accordingly, in the present embodiment, the thrust force acting between the first compressor-side helical gear 43 and the first motor-side helical gear 45 is offset by the thrust force acting between the second compressor-side helical gear 44 and the second motor-side helical gear 46. For this reason, in the present embodiment, bearings that bear the compressor-side shaft 41 and the motor-side shaft 42 of the speed reducer 40 can be simplified or miniaturized.

As described above, the speed reducer 40 of the present embodiment has two pairs of helical gears. As described above, the energy source of the power MP received/transmitted by the induction motor 22 is the first rotor 17 and the rotational inertial energy of the rotating system that is mechanically coupled to the first rotor 17. In the present embodiment, the two pairs of helical gears are included in the rotating system. Accordingly, in the present embodiment, the rotational inertial energy of the rotating system is greater than in a case where the motor rotor 22*r* and the compressor rotor 11*r* are directly coupled or in a case where the speed reducer has only a pair of helical gears.

Figure 8:
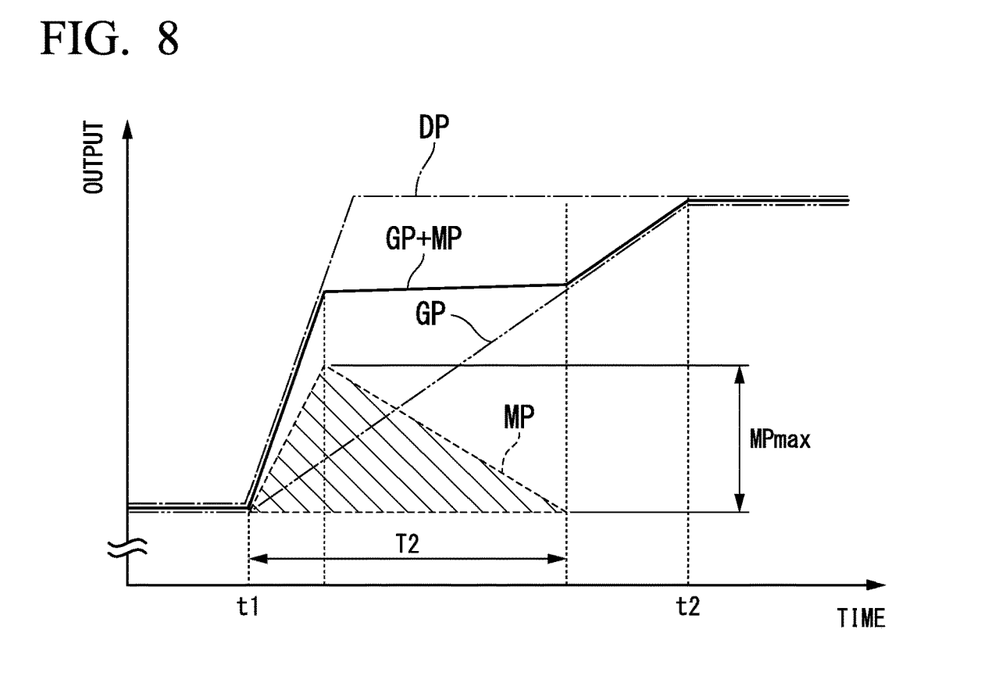
FIG. 8 is an explanatory view illustrating a change in output when suddenly increasing request output is received in a comparative example.

Here, a change in output when a two-shaft gas turbine power generation equipment in which a motor rotor 22*r* and a compressor rotor 11*r* are directly coupled is set as a comparative example, and demand output DP suddenly increasing in the comparative example will be described with reference to FIG. 8.

Similarly to the embodiment, in the comparative example, when the demand output DP suddenly increases, power MP from an induction motor 22 is transmitted to an power system 1. As described above, the energy source of the power MP received/transmitted by the induction motor 22 is the first rotor 17 and the rotational inertial energy of the rotating system that is mechanically coupled to the first rotor 17. In the comparative example, since there is no speed reducer 40, the rotational inertial energy of the rotating system is smaller than in the present embodiment. For this reason, even if maximum allowable output MPmax of a motor of the comparative example is the same as the maximum allowable output MPmax of the induction motor 22 of the present embodiment, a time T2 for which the power MP can be transmitted from the motor of the comparative example to the power system 1 is shorter than a time T1 (see FIG. 7) for which the power MP can be transmitted from the induction motor 22 of the present embodiment to the power system 1. As a result, in the two-shaft gas turbine power generation equipment of the comparative example, in the case where the demand output DP is suddenly changed, a period of time in which power transmitted from the two-shaft gas turbine power generation equipment to the power system 1 follows the demand output DP is shortened.

On the other hand, in the present embodiment, the two pairs of helical gears are included in the first rotor 17 and the rotating system that is mechanically coupled to the first rotor 17. Accordingly, in the present embodiment, the rotational inertial energy of the rotating system is greater than in a case where the comparative example or the speed reducer has only a pair of helical gears. For this reason, in the present embodiment, in the case where the demand output DP is suddenly changed, the period of time in which the power transmitted from the two-shaft gas turbine power generation equipment to the power system 1 follows the demand output DP is longer than in the case where the comparative example or the speed reducer has only a pair of helical gears. That is, in the present embodiment, followability of output of the two-shaft gas turbine power generation equipment against a change in the demand output can be improved.

As described above, in the present embodiment, since the compressor rotor 11*r* and the motor rotor 22*r* are mechanically coupled via the speed reducer 40, the allowable maximum rotational speed required of the induction motor 22 can be suppressed. Accordingly, in the present embodiment, since there is no need to use a special motor in which the allowable maximum rotational speed is, for example, 6000 rpm, equipment costs can be reduced.

Both torque for rotating the compressor rotor 11*r* that is at a stop and torque for assisting rotation of the compressor rotor 11*r* in a power generation mode become great torque. If the compressor rotor 11*r* and the motor rotor 22*r* are directly coupled, great torque is required, for example, at a rotational speed that is 0 to 100 rpm at the time of starting as well as a rotational speed that is 6000 rpm in the power generation mode. In this way, to obtain great torque in a wide rotational speed range, there is a need to use two motors, which are a starting motor and an assist motor. In the present embodiment, as described above, since the allowable maximum rotational speed can be suppressed, a rotational speed range where great torque is required can be narrowed. For this reason, in the present embodiment, one motor can cope with both the time of starting and the time of assist.

In the present embodiment, since the helical gears are used for the gears of the speed reducer 40, the delay of the torque transmission when the direction of the torque transmission is changed can be suppressed. Further, in the present embodiment, since the directions of the twist of the tooth traces of the two pairs of helical gears are opposite to each other, generation of a thrust force can be suppressed.

The first rotor 17 and the second rotor 18 of the two-shaft gas turbine 10 are expanded by heat caused by an operation of the two-shaft gas turbine 10. In the present embodiment, since the first rotor 17 and the compressor-side shaft 41 of the speed reducer 40 are mechanically coupled via the first diaphragm coupling 25, the thermal expansion of the first rotor 17 can be absorbed by the first diaphragm coupling 25. Further, in the present embodiment, since the second rotor 18 and the power generator rotor 21r are mechanically coupled via the second diaphragm coupling 26, the thermal expansion of the second rotor 18 can be absorbed by the second diaphragm coupling 26.

In the present embodiment, a thrust bearing 27 is provided on the compressor-side shaft 41 of the speed reducer 40. As described above, even if the thermal expansion of the first rotor 17 is absorbed to a certain degree by the first diaphragm coupling 25, the entire thermal expansion of the first rotor 17 cannot be absorbed. For this reason, to regulate movement of the compressor-side shaft 41 of the speed reducer 40 in a thrust direction, the thrust bearing 27 is provided on the compressor-side shaft 41. Since the thrust bearing 27 is provided in this way, an amount of the movement of the compressor-side shaft 41 in the thrust direction can be reduced.

As described above, since the compressor-side helical gears 43 and 44 and the motor-side helical gears 45 and 46 are consistently in point contact with each other, when the compressor-side helical gears 43 and 44 move in the thrust direction, the motor-side helical gears 45 and 46 also move in the thrust direction by the same amount as an amount of the movement. Assuming that the motor-side helical gears 45 and 46 are fixed to the motor-side shaft 42, the motor-side helical gears 45 and 46, the motor-side shaft 42 to which these gears are fixed, and the motor rotor 22r that is directly coupled to the motor-side shaft 42 move in the thrust direction in association with the movement of the compressor-side helical gears 43 and 44 in the thrust direction. It is preferred that the motor rotor 22r does not move in the thrust direction or an amount of the movement in the thrust direction is very small. In the present embodiment, as described above, both the first motor-side helical gear 45 and the second motor-side helical gear 46 are mounted to be movable relative to the motor-side shaft 42 in the thrust direction. For this reason, in the present embodiment, even if the compressor-side helical gears 43 and 44 move in the thrust direction so that the motor-side helical gears 45 and 46 move in the thrust direction, the movement of the motor-side shaft 42 to which the gears are fixed and the movement of the motor rotor 22r directly coupled to the motor-side shaft 42 in the thrust direction can be suppressed.

In the present embodiment, the thrust bearing 27 is provided at an end of the compressor-side shaft 41 which is located on a side opposite to the compressor 11. However, the thrust bearing 27 may be provided at a compressor-side end of the compressor-side shaft 41. Further, the thrust bearing 27 may be provided at an end of the motor-side shaft 42. Further, in the present embodiment, the first and second motor-side helical gears 45 and 46 are mounted to be movable relative to the motor-side shaft 42 in the thrust direction. However, the first and second compressor-side helical gears 43 and 44 may be mounted to be movable relative to the compressor-side shaft 41 in the thrust direction. Further, in a case where the movement of the motor rotor 22r of the induction motor 22 in the thrust direction can be allowed to a certain degree, the first and second motor-side helical gears 45 and 46 may be mounted to be immovable relative to the motor-side shaft 42 in the thrust direction, and the first and second compressor-side helical gears 43 and 44 may be mounted to be immovable relative to the compressor-side shaft 41 in the thrust direction.

Figure 9:
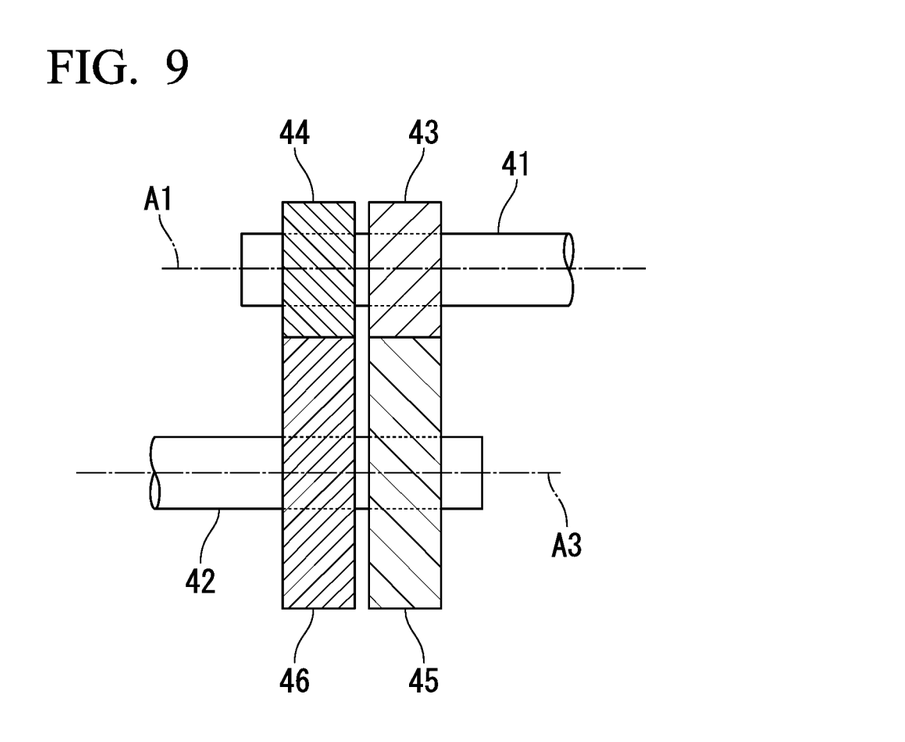
FIG. 9 is a schematic side view of a speed reducer in a modification of the embodiment of the present invention.

Further, in the present embodiment, the number of teeth of the second compressor-side helical gear 44 is the same as the number of teeth of the first compressor-side helical gear 43, and the number of teeth of the second motor-side helical gear 46 is the same as the number of teeth of the first motor-side helical gear 45. However, as illustrated in FIG. 9, the number of teeth of the second compressor-side helical gear 44 may be different from the number of teeth of the first compressor-side helical gear 43, and the number of teeth of the second motor-side helical gear 46 may be different from the number of teeth of the first motor-side helical gear 45. A ratio between the number of teeth of the first compressor-side helical gear 43 and the number of teeth of the first motor-side helical gear 45 is the same as a ratio between the number of teeth of the second compressor-side helical gear 44 and the number of teeth of the second motor-side helical gear 46. In this way, when the number of teeth of the second compressor-side helical gear 44 is different from the number of teeth of the first compressor-side helical gear 43, and when the number of teeth of the second motor-side helical gear 46 is different from the number of teeth of the first motor-side helical gear 45, a dimension of the backlash between the first compressor-side helical gear 43 and the first motor-side helical gear 45 is different from a dimension of the backlash between the second compressor-side helical gear 44 and the second motor-side helical gear 46, and thus the delay of the torque transmission when the direction of the torque transmission is changed can be further suppressed.

INDUSTRIAL APPLICABILITY

According to the aspect of the present invention, the delay of the torque transmission when the direction of the torque transmission is changed can be minimized while suppressing the allowable maximum rotational speed required of the motor.

REFERENCE SIGNS LIST

1 Power system
10 Two-shaft gas turbine
11 Compressor
11c Compressor casing
11r Compressor rotor
12 Combustor
13 High-pressure turbine
13c High-pressure turbine casing
13r High-pressure turbine rotor
14 Low-pressure turbine
14c Low-pressure turbine casing
14r Low-pressure turbine rotor
15 Fuel regulating valve
16 Fuel line
17 First rotor
18 Second rotor
21 Power generator 21c Power generator casing
21r Power generator rotor
22 Induction motor
22c Motor casing
22r Motor rotor
24 Frequency converter
25 First diaphragm coupling
25c Center tube
25f Flange
26 Second diaphragm coupling
27 Thrust bearing
31 Primary power path
34 Secondary power path
40 Speed reducer
41 Compressor-side shaft
42 Motor-side shaft
43 First compressor-side helical gear
44 Second compressor-side helical gear
45 First motor-side helical gear
46 Second motor-side helical gear
47 Key (coupling tool)
50 Control unit
51 Receiver
52 Determiner
53 Conversion controller
54 Fuel controller
A1 First axis
A2 Second axis
A3 Third axis
CP Contact point
VP Virtual plane

The invention claimed is:

1. A two-shaft gas turbine power generation equipment comprising:
    a compressor having a compressor rotor and configured to compress air to produce compressed air by rotation of the compressor rotor;
    a combustor configured to burn a fuel in the compressed air to produce a combustion gas;
    a high-pressure turbine having a high-pressure turbine rotor that is mechanically coupled with the compressor rotor and in which the high-pressure turbine rotor is rotated by the combustion gas;
    a low-pressure turbine having a low-pressure turbine rotor that is not coupled to the high-pressure turbine rotor and in which the low-pressure turbine rotor is rotated by the combustion gas exhausted from the high-pressure turbine;
    a power generator configured to generate power in rotation of the low-pressure turbine rotor and electrically connected to a power system to which alternating current power flows;
    an induction motor being electrically connected to the power system in parallel with the power generator and configured to receive/transmit the power from/to the power system;
    a frequency converter being provided between the induction motor and the power system in an electrical connection relationship, configured to control reception/transmission of the power between the induction motor and the power system, convert a frequency of the power from the induction motor into a frequency of the power system when the power from the induction motor is transmitted toward the power system, and convert the frequency of the power from the power system to the frequency of the power from the induction motor when the power from the vicinity of the power system is received and supplied to the induction motor; and
    a speed reducer configured to make a rotational speed of a motor rotor of the induction motor slower than a rotation speed of the compressor rotor,
    wherein the speed reducer has:
    a compressor-side shaft that is mechanically coupled with the compressor rotor;
    a motor-side shaft that is disposed parallel to the compressor-side shaft at an interval to be non-movable relative to the motor rotor, and is mechanically coupled with the motor rotor;
    a first compressor-side helical gear that is mounted on the compressor-side shaft and is rotated integrally with the compressor-side shaft;
    a first motor-side helical gear that is mounted on the motor-side shaft, is rotated integrally with the motor-side shaft, and meshes with the first compressor-side helical gear;
    a second compressor-side helical gear that is mounted on the compressor-side shaft and is rotated integrally with the compressor-side shaft; and
    a second motor-side helical gear that is mounted on the motor-side shaft, is rotated integrally with the motor-side shaft, and meshes with the second compressor-side helical gear, and
    wherein the number of teeth of the second compressor-side helical gear is different from the number of teeth of the first compressor-side helical gear.

2. The two-shaft gas turbine power generation equipment according to claim 1, wherein the induction motor is configured such that output thereof is monotonously increased or reduced with respect to a change in rotational speed thereof in a rotational speed range including a rotational speed obtained by multiplying a rated rotational speed predetermined for the high-pressure turbine rotor by a reduction ratio based on the speed reducer.

3. The two-shaft gas turbine power generation equipment according to claim 2, wherein the rated rotational speed of the high-pressure turbine rotor ranges from 4000 rpm to 7000 rpm.

4. The two-shaft gas turbine power generation equipment according to claim 1, wherein a reduction ratio of the speed reducer ranges from 9/10 to 1/5.

5. The two-shaft gas turbine power generation equipment according to claim 1, wherein a direction of a twist of each tooth trace of the second compressor-side helical gear is opposite to that of a twist of each tooth trace of the first compressor-side helical gear.

6. The two-shaft gas turbine power generation equipment according to claim 1, wherein the speed reducer has one of a compressor-side coupling tool that mounts the first and second compressor-side helical gears to be non-rotatable relative to the compressor-side shaft and to be movable relative to the compressor-side shaft in a thrust direction in which the compressor-side shaft extends, and a motor-side coupling tool that mounts the first and second motor-side helical gears to be non-rotatable relative to the motor-side shaft and to be movable relative to the compressor-side shaft in the thrust direction in which the motor-side shaft extends.

7. The two-shaft gas turbine power generation equipment according to claim 1, further comprising a coupling that mechanically couples the compressor rotor and the compressor-side shaft,
    wherein the coupling has a displacement absorber configured to absorb displacement of the compressor rotor in at least one of a thrust direction of the compressor rotor and a radial direction of the compressor rotor.

8. The two-shaft gas turbine power generation equipment according to claim 7, wherein the coupling is a diaphragm coupling.

* * * * *